US008820382B1

(12) United States Patent
Renkert

(10) Patent No.: US 8,820,382 B1
(45) Date of Patent: Sep. 2, 2014

(54) HANDHELD PAINTING AND CAULKING TAPE DISPENSER

(71) Applicant: Michael F. Renkert, Denver, CO (US)

(72) Inventor: Michael F. Renkert, Denver, CO (US)

( * ) Notice: Subject to any disclaimer, the term of this patent is extended or adjusted under 35 U.S.C. 154(b) by 0 days.

(21) Appl. No.: 13/629,738

(22) Filed: Sep. 28, 2012

(51) Int. Cl.
*B44C 7/00* (2006.01)
*B32B 38/10* (2006.01)
*B32B 27/00* (2006.01)

(52) U.S. Cl.
USPC ............................ 156/577; 156/242; 156/523

(58) Field of Classification Search
USPC ......... 156/242, 523, 247, 527, 574, 576, 579, 156/526, 545; 225/56, 26, 39, 54, 15, 10, 225/11, 14, 16, 51, 89
See application file for complete search history.

(56) References Cited

U.S. PATENT DOCUMENTS 3,536,569 A * 10/1970 Gosnell ......................... 156/527
3,871,940 A 3/1975 Antonioni
4,238,271 A * 12/1980 Urushizaki ................... 156/523
4,400,231 A 8/1983 Martin
5,043,228 A 12/1991 Lin
5,076,883 A 12/1991 Busley
2001/0023882 A1* 9/2001 Gilkes ............................. 225/26
2011/0057010 A1* 3/2011 Jonker ............................ 225/39

OTHER PUBLICATIONS

Renkert, Michael, "Specification", U.S. Appl. No. 12/840,298, filed Jul. 21, 2010, laid open to the public on Dec. 9, 2010.*
Renkert, Michael, "Drawings", U.S. Appl. No. 12/840,298, filed Jul. 21, 2010, laid open to the public on Dec. 9, 2010.*

* cited by examiner

*Primary Examiner* — Philip Tucker
*Assistant Examiner* — Alex Efta
(74) *Attorney, Agent, or Firm* — Edwin H. Crabtree; Ramon L. Pizarro

(57) ABSTRACT

A tape dispenser having a tape housing adapted for receiving a tape roll of painting and caulking tape. The housing includes a closed front portion and an open rear portion. The rear portion is used for inserting the tape roll on a tape ring. The housing also includes a small semi-circular nose with one end of a flat first tape engaging surface and with one end of a flat second tape engaging surface extending outwardly from the nose at a selected acute angle "Δ". The angle "Δ" provides for cutting the tape to an exact length to an intersection of two right angle surfaces. A large semi-circular handle is integrally formed at opposite ends of the first and second tape engaging surfaces. The handle is used for gripping the housing and dispensing tape therefrom.

12 Claims, 5 Drawing Sheets

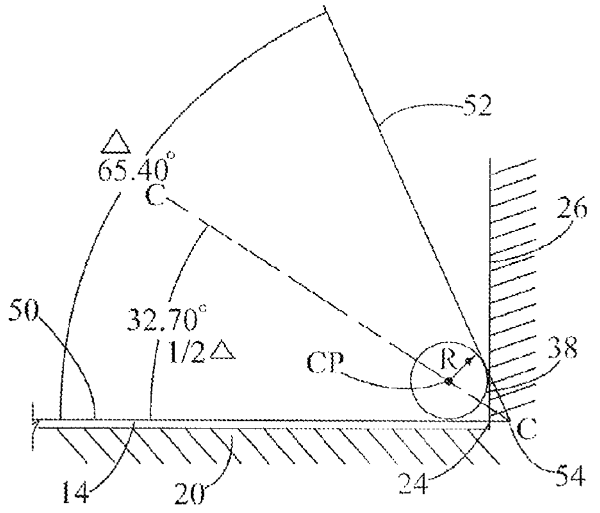
FIG. 8
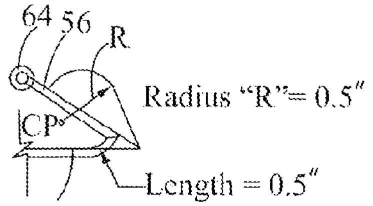
FIG. 8A
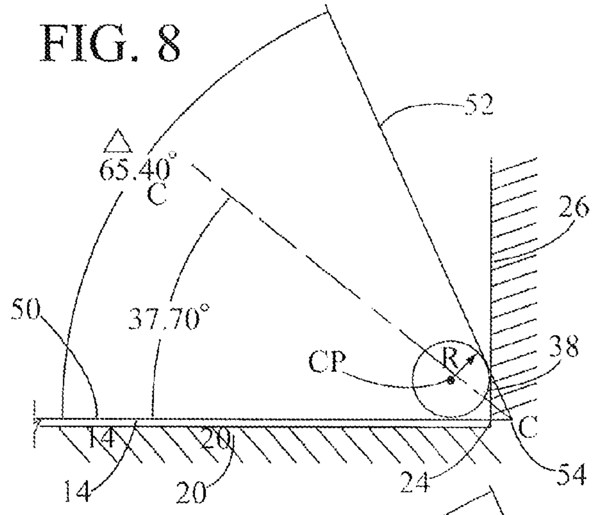
FIG. 9
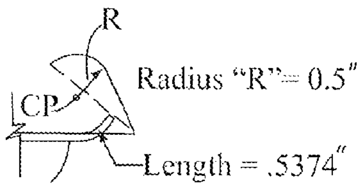
FIG. 9A
FIG. 10
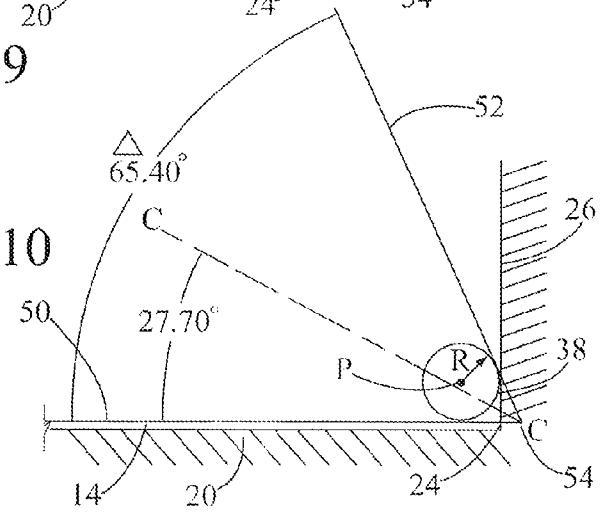
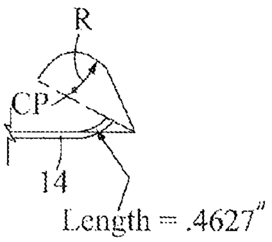
FIG. 10A

HANDHELD PAINTING AND CAULKING TAPE DISPENSER

This continuation-in-part, CIP, patent application claims the benefit of an earlier filed non-provisional, utility patent application Ser. No. 13/253,057, filed on Oct. 4, 2011, by the subject inventor, and having a title of "Tape Dispenser Apparatus".

BACKGROUND OF THE INVENTION (a) Field of the Invention

This invention relates to a tape dispenser for use in various types of tape and masking applications and more particularly, but not by way of limitation, to a portable, handheld painting and caulking tape dispenser. The tape dispenser used for dispensing tape along edges, sides and corners of walls, floors, ceilings, window frames, and door frames, prior to painting. Also, the tape dispenser is used for dispensing tape around bathroom tubs and sinks and around kitchen and washroom sinks, prior to caulking.

(b) Discussion of Prior Art

Heretofore, there have been a variety of tape dispensers, carton sealers, and tape cutters for household applications and used for dispensing tape and taping and sealing cartons and boxes. In U.S. Pat. No. 4,400,231 to Martin, a one-piece, hand-held tape dispenser is disclosed having a housing frame for holding a roll of tape. The frame includes a tape pressing surface next to a cutting edge for cutting the tape after a desired length of tape is dispensed. U.S. Pat. No. 5,073,228 to Lin also describes a carton sealing sticker and cutter having a housing body for holding a tape roll. The housing includes a retractable cutter device, which can be extended outwardly from the housing when cutting the tape. U.S. Pat. No. 5,076,883 to Bosley illustrates a highlighter tape dispenser having a housing with a roll of highlighter tape. The housing includes a slidable tape cutter, which can cut a tape to length when extended outwardly from one end of the housing.

None of these prior art patents provide the unique structural features and function of the subject invention as described herein.

SUMMARY OF THE INVENTION

In view of the foregoing, it is a primary objective of the subject invention to provide a hand-held, tape dispenser for dispensing an adhesive tape for various types of painting and caulking applications. The tape dispenser is designed to dispense tape in one direction and then reversed for dispensing tape in an opposite direction.

A key object of the tape dispenser is its ability to dispense tape into an intersection of a right angle corner and cut the tape to an exact length to the intersection. Heretofore, users of prior art tape dispensers merely guessed on how much to cut a tape to length to reach a right angle corner and more often than not cut the tape either too long or too short.

Still another object of the invention is the tape dispenser includes one or more tape spacers and a tape spacer with a wing for attachment to a dispenser housing. The tape spacers are used for creating a selected space from an edge or side of a surface. The selected space are used for receiving caulking, painting stripes and other applications.

The subject invention includes a tape housing for receiving a tape roll of painting and caulking tape. This type of tape is typically colored blue and comes in various widths with an adhesive side and a non-adhesive side. The tape housing has a closed front portion and an open rear portion. The open rear portion is used for inserting the tape roll on a tape ring mounted inside the tape housing.

The tape housing includes a small semi-circular nose with one end of a flat first tape engaging surface and with one end of a flat second tape engaging surface extending outwardly from the nose at a selected acute angle "Δ". A large semi-circular handle is integrally formed at an opposite end of the first and second tape engaging surfaces for gripping the tape housing and dispensing tape therefrom.

These and other objects of the present invention will become apparent to those familiar with tape dispensers and the taping and masking of walls, floors, ceilings, and window and door frames when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for its practical application, and in which:

FIG. 8 illustrates the acute angle "Δ" at 65.40 degrees from the horizontal and with a center line C-C through the acute angle at 32.70 degrees from the horizontal and through a center point in the semi-circular nose and through an intersection of the lines making up the acute angle. This key feature allows the tape to be cut to an exact length to the intersection of the horizontal surface and the second wall. A length of the cutting blade is disposed along the length of the center line C-C.

FIG. 8A illustrates, as an example, an end of the tape is cut by the cutting blade at 0.5 inches and equal to a radius "R" of 0.5 inches of the semi-circular nose.

FIG. 9 illustrates the acute angle "Δ" at 65.40 degrees from the horizontal but with the center line C-C raised to an angle at 37.70 degrees from the horizontal and off set from the center point in the semi-circular nose and through the intersection of the lines making up the acute angle. This feature doesn't allow the tape to be cut to an exact length to the intersection of the horizontal surface and the second wall.

FIG. 9A illustrates, as an example, the end of the tape cut at 0.5374 inches and greater than the radius "R" of 0.5 inches of the semi-circular nose.

FIG. 10 illustrates the acute angle "Δ" at 65.40 degrees from the horizontal but with the center line C-C lowered to an angle at 27.70 degrees from the horizontal and off set from the center point in the semi-circular nose and through the intersection of the lines making up the acute angle. This feature doesn't allow the tape to be cut to an exact length to the intersection of the horizontal surface and the second wall.

FIG. 10A illustrates, as an example, the end of the tape cut at 0.4627 inches and less than the radius "R" of 0.5 inches of the semi-circular nose.

DETAILED DESCRIPTION OF THE PREFERRED EMBODIMENTS

Figure 1:
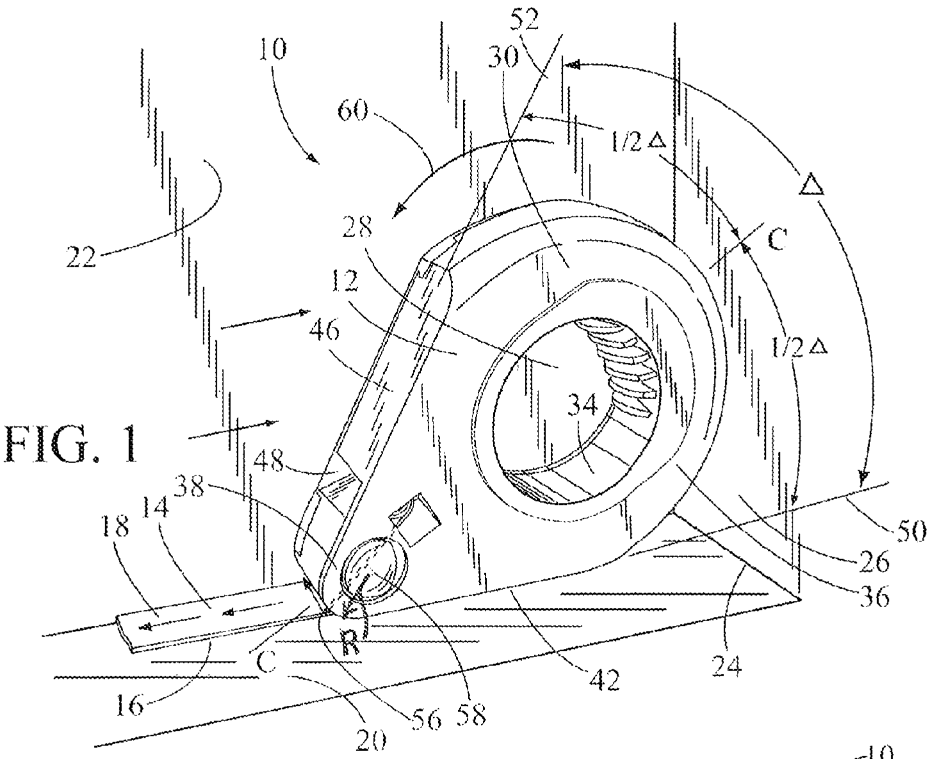
FIG. 1 is a front perspective view of the subject tape dispenser with a tape housing for dispensing tape along a portion of a horizontal surface next to a first wall and approaching an intersection of the first wall and a second wall. The tape housing having a line on a flat first tape engaging surface and a line on a flat second tape engaging surface for forming an acute angle "Δ".
Figure 4:
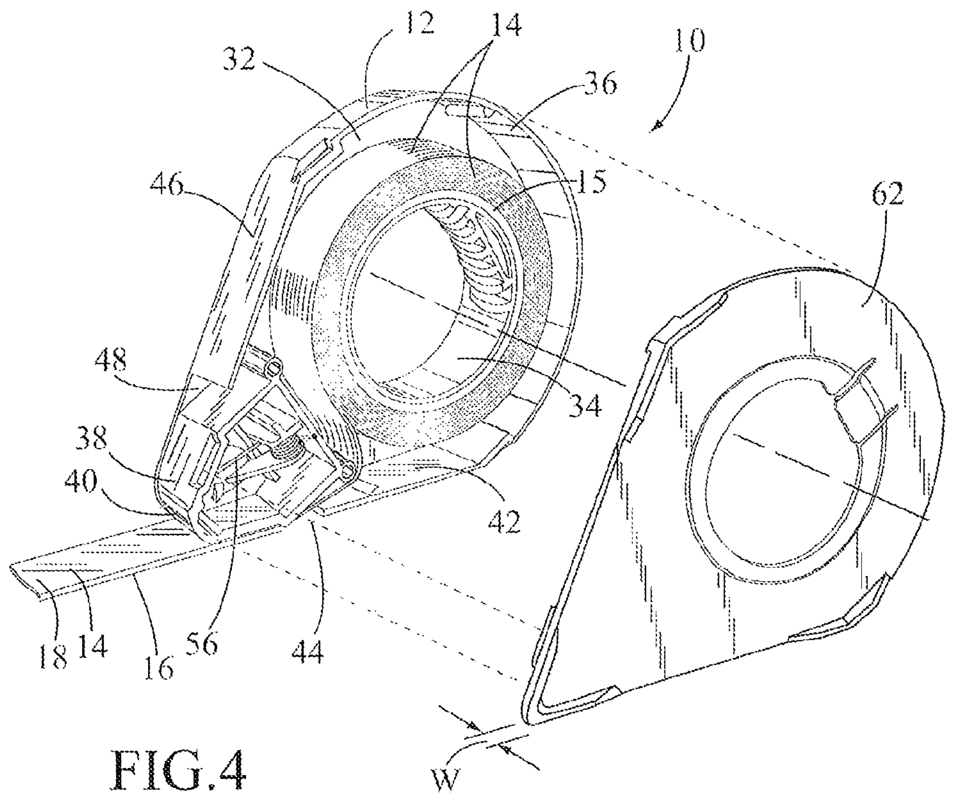
FIG. 4 is a perspective view of the subject tape dispenser with an open rear portion of the tape housing positioned for receiving a tape spacer. The tape spacer used for holding the tape dispenser a selected distance from a wall, floor, ceiling, door or window frame and like surfaces.
Figure 5:
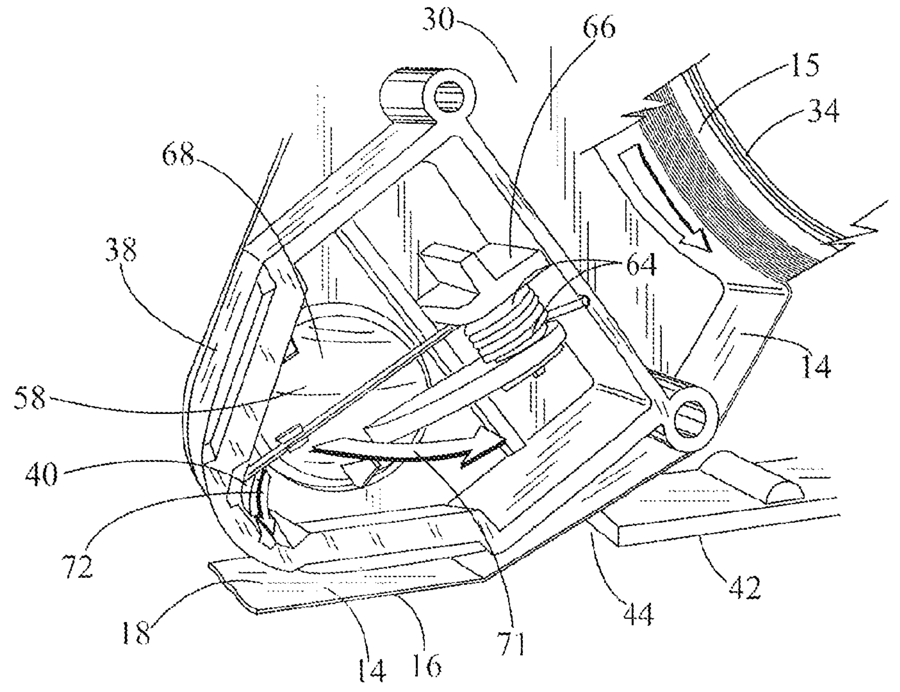
FIG. 5 is an enlarged view of a tape cutting blade and blade actuator for cutting the tape to length. The cutting blade and blade actuator are mounted inside a semi-circular nose in the tape housing.

In FIG. 1, a front perspective view of the subject hand-held, painting and caulking tape dispenser is illustrated having general reference numeral 10. The tape dispenser 10 includes a tape housing 12 adapted for dispensing an adhesive tape 14 from a tape roll 15. The tape roll 15 is shown in FIGS. 4 and 5. The tape 14 includes an adhesive side 16 and a non-adhesive side 18. The tape housing 12 is adapted for apply the tape 14 to a horizontal surface 20 and next to a vertical, first wall 22 and to an intersection 24 of the first wall 22 and a vertical, second wall 26. As mentioned above, the tape dispenser is adapted for taping and masking various types of horizontal and vertical surfaces found in a residential home or office building:

The tape housing 12 includes a center hole 28 therethrough and a closed front portion 30 and an open rear portion 32. The open rear portion 32 is shown more clearly in FIG. 4. A portion of the closed front portion 30 has been cutaway to show the open rear portion 32 and a tape ring 34 mounted inside the housing and disposed next to the center hole 28. The tape ring 34 is shown with the tape roll 15 mounted thereon.

Figure 3:
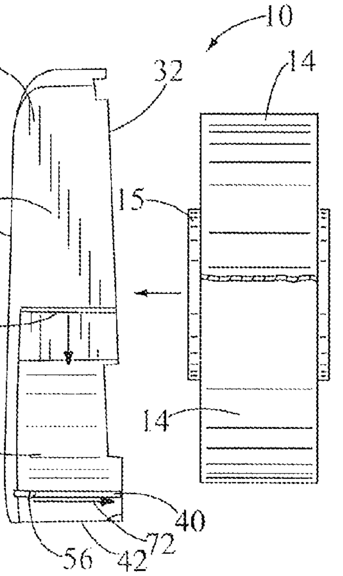
FIG. 3 is a front view of the tape housing taken along lines 3-3, shown in FIG. 2, and a tape roll positioned for inserting into the inside of the tape housing.

In this drawing, a large, semi-circular handle 36 is formed in one end of the tape housing 12 for gripping the housing and dispensing the tape 14 therefrom. A small, semi-circular nose 38, having a radius "R", is formed in an opposite end of the housing 12 for receiving a portion of the tape thereon. The nose 38 includes a cutting blade opening 40 therein. The cutting blade 40 opening is shown in FIG. 3. The opening 40 is perpendicular to a length of the tape 14.

The tape housing 12 also includes a flat first tape engaging surface 42 disposed along one side of the housing and between the nose 38 and the handle 36. The first tape engaging surface 42 includes a first tape opening 44 therein for receiving the tape 14 from the tape roll 15 and dispensing the tape under the nose 38 and onto the receiving surface. The first tape opening 44 can seen in FIGS. 4 and 5.

A flat second tape engaging surface 46 is disposed along an opposite side of the housing 12 and between the nose 38 and the handle 36. The second tape engaging surface 46 includes a second tape opening 48 therein for receiving the tape 14 from the tape roll 15 and dispensing the tape under the nose 38 and in an opposite direction as shown in FIG. 1.

A first line 50 along the length of the flat, first tape engaging surface 42 and a second line 52 along a length of the flat, second engaging surface 46 form an acute angle "Δ", at 65.40 degrees from the horizontal, as shown in FIG. 8. Also, a center line C-C is shown at ½ Δ or 37.70 degrees from the horizontal. The center line C-C is through a center point of the semi-circular nose 38 and through an intersection 54 of the acute angle "Δ", as shown in FIG. 8.

A tape cutting blade 56, shown in dashed lines, is pivotally attached to a blade actuator 58 and mounted inside of the tape housing 12. This feature of the invention is shown more clearly in FIGS. 4 and 5. The blade actuator 58 extends the cutting blade 56 outwardly from the cutting blade opening 40 in the nose 38 for cutting the tape 14 to a proper length. It shown be mentioned, unlike other prior art tape dispensers, when the handle 36 engages the second wall 26, as shown this drawing, the tape dispenser 10 is rotated counterclockwise, as shown by arrow 60.

Figure 2:
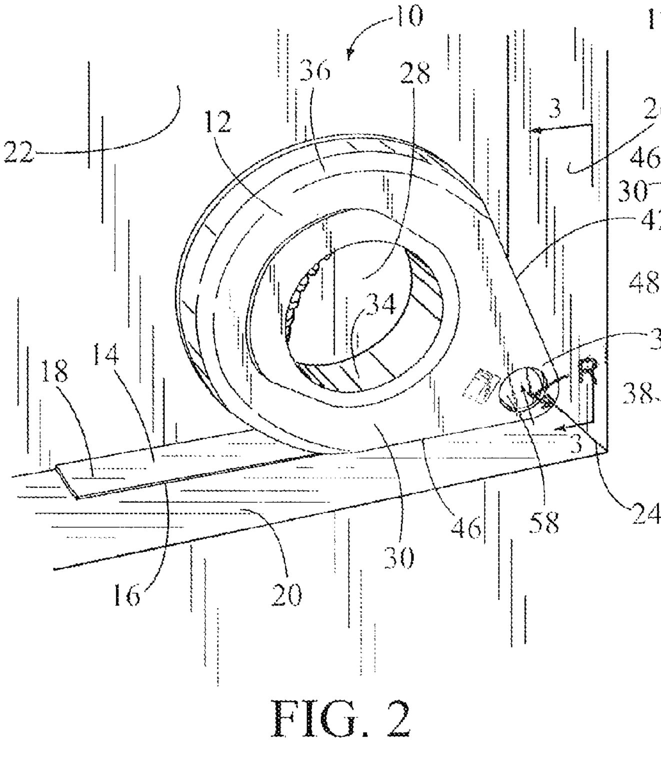
FIG. 2 is another perspective view of the tape dispenser shown in FIG. 1, with the tape housing, when contacting the second wall, rotated counterclockwise. A semi-circular tape nose on a tape housing is shown contacting the second wall and the tape ready to be cut to length.

In FIG. 2, another perspective view of the tape dispenser 10 is shown. At this time, the flat, second tape engaging surface 46 is now disposed on top of the tape 14 and the tape continues to be dispensed out the first tape opening 44 until the semi-circular nose 38 engages the second wall 26. When the nose 38 contacts the second wall, as shown in this drawing, the tape 14 is ready to be cut to length using the tape actuator 58 and the cutting blade 56.

In FIG. 3, a front view of the tape housing 12 is illustrated and taken along lines 3-3, shown in FIG. 2. A tip of the cutting blade 56 is shown extending outwardly from the cutting blade opening 40. Also, the tape roll 15 with tape 14 is shown positioned for inserting into the inside of the tape housing 12 and around the tape ring 34.

In FIG. 4, a perspective view of the subject tape dispenser 10 is shown with the open rear portion 32 of the tape housing 12 positioned for receiving a tape spacer 62 and attached thereto. The tape spacer 62 is used for holding the tape dispenser 10 a selected width "W" from a wall, floor, ceiling, door or window frame and like surfaces. The selected width "W", such as ⅛, ¼, ⅜, ½ and greater, is used for receiving caulking next to the tape 14 or painting stripped lines next to the tape and similar applications.

In FIG. 5, an enlarged view of a tape cutting blade 56 and blade actuator 58 is illustrated for cutting the tape 14 to length. The cutting blade 56 and blade actuator 58 are mounted inside the semi-circular nose 38 in the tape housing 12. The blade actuator 58 includes a coil spring 64 mounted on a base 66. The coil spring 64 is connected to one end of the cutting blade 56. An opposite end or cutting tip of the cutting blade 56 is biased by the coil spring 64 against an actuator button 68. The actuator button 68 is attached to a pivot arm 70 mounted on the base 66.

In operation, the actuator button 68 is held in a closed position by the coil spring 64, as shown in FIGS. 1 and 2. When the button 68 is pushed inwardly by a thumb or finger of the tape dispenser operator, as indicated by arrow 71, the button moves the cutting blade 56, from left to right, as shown by arrow 72 in this drawing and in FIGS. 3 and 7. At this time, the cutting blade 56 is moved from a retracted position inside the housing 12 into an extended position, with the cutting blade tip moving outward from the cutting blade opening 40 and cutting the tape 14 across its width. When the button 68 is released, the coil spring 64 returns the button and the cutting blade to its retracted position inside the semi-circular nose 38.

Figure 6:
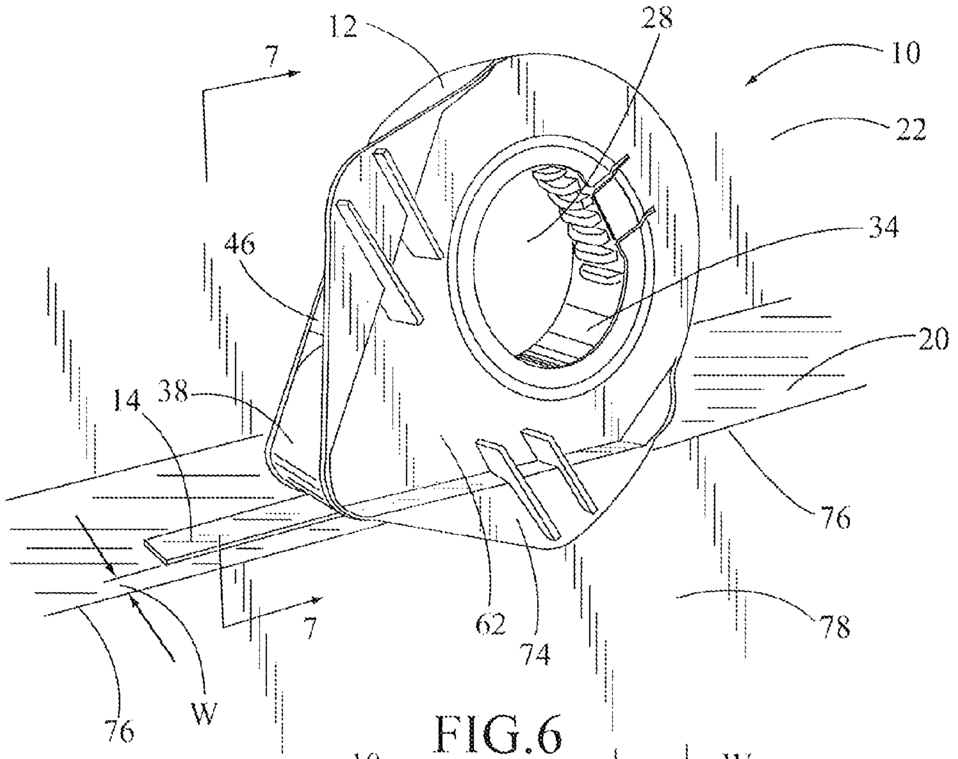
FIG. 6 is a perspective view of the tape housing with a tape spacer with a guide wing used for spacing the tape a selected distance from an edge of a horizontal surface.

In FIG. 6, a perspective view of the tape housing 12 is shown with the tape spacer 62 with a downwardly extending wing 74. The spacer with wing is used for spacing the tape 14 a selected distance from an edge 76 of the horizontal surface 20, with the wing 74 used as a guide along the edge.

Figure 7:
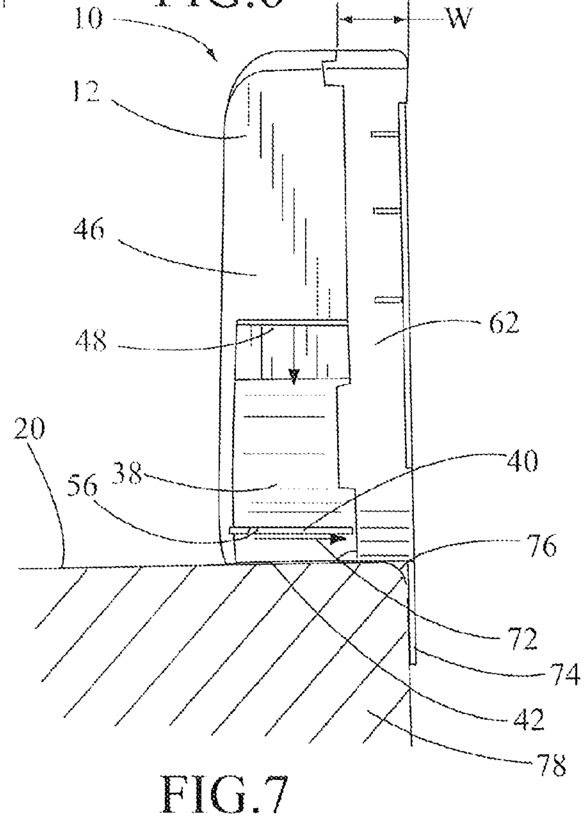
FIG. 7 is a front view of the tape housing taken along lines 7-7, shown in FIG. 6.

In FIG. 7, a front view of the tape housing 12 is illustrated taken along lines 7-7, shown in FIG. 6. In this drawing, the spacer 62 is shown holding the tape housing a width "W' away from the edge 76 and the wing 74 disposed against a vertical surface 78.

In FIG. 8, the acute angle "Δ" at 65.40 degrees from the horizontal surface 20 is shown with a center line C-C through the acute angle at 32.70 degrees, or "½Δ", from the horizontal and through a center point "CP" in the semi-circular nose 38 and through the intersection 54 of the lines 50 and 52, making up the acute angle. The semi-circular nose 38 is depicted as a circle in FIGS. 8-10A. This key feature, found through trial and error and with a length of the cutting blade disposed along the center line C-C, allows the tape 14 to be cut to an exact length to the intersection 24 of the horizontal surface 20 and the second wall 26. As mentioned above, this feature eliminates guess work, when cutting tape to an intersection of two right angle surfaces.

In FIG. 8A, as an example, the end of the tape 14 is cut at 0.5 inches and equal to the radius "R" of the semi-circular nose 38. The radius "R", in is this example, is 0.5 inches. In this drawing, the length of the cutting blade 56 is shown disposed along the center line C-C through the center point CP of the nose 38.

In FIG. 9, the acute angle "Δ" at 65.40 degrees from the horizontal is shown, but with the center line C-C raised to an angle at 37.70 degrees from the horizontal and off set from the center point "CP" in the semi-circular nose 38 and through the intersection 54 of the lines making up the acute angle. This feature doesn't allow the tape 14 to be cut to an exact length to the intersection 24 of the horizontal surface 20 and the second wall 26.

In FIG. 9A, as an example, the end of the tape is cut at 0.5374 inches and is greater than the radius "R" of 0.5 inches of the semi-circular nose 38.

In FIG. 10, the acute angle "Δ" at 65.40 degrees from the horizontal is shown, but with the center line C-C lowered to an angle at 27.70 degrees from the horizontal and off set from the center point "CP" in the semi-circular nose 38 and through the intersection 54 of the lines making up the acute angle. This feature doesn't allow the tape to be cut to an exact length to the intersection 24 of the horizontal surface 20 and the second wall 26.

In FIG. 10A, the end of the tape is cut at 0.4627 inches and is less than the radius "R" of 0.5 inches of the semi-circular nose 38.

Figure 11:
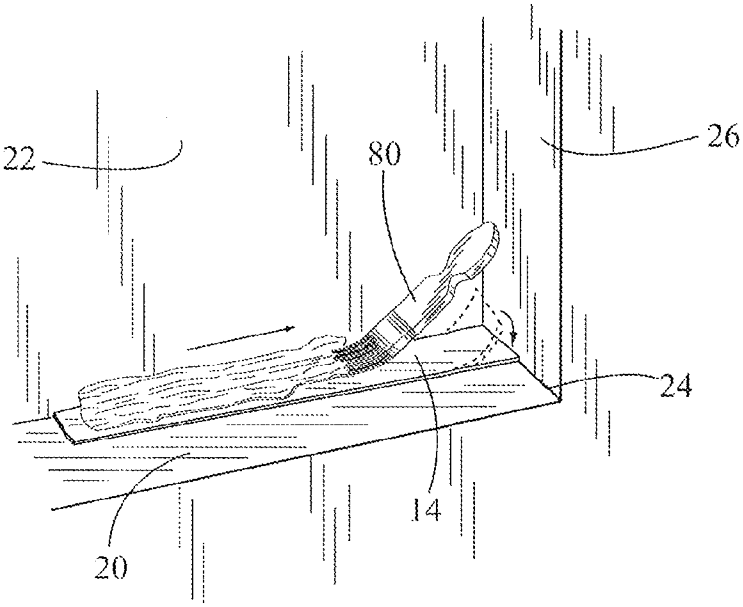
FIG. 11 is a perspective view of a paint brush painting a lower portion of the first wall and the tape protecting the horizontal surface from unwanted paint. The tape is shown cut to an exact length to the intersection of the horizontal surface and the second wall, as shown in FIGS. 8 and 8A.

In FIG. 11, a perspective view of a paint brush 80 is shown painting a lower portion of the first wall 22 and the tape 14 protecting the horizontal surface 20 from unwanted paint. It should be noted, the tape 14 is shown, in dashed lines and solid lines, cut to an exact length to the intersection 24 of the horizontal surface 20 and the second wall 26, as depicted in FIGS. 8 and 8A.

Figure 12:
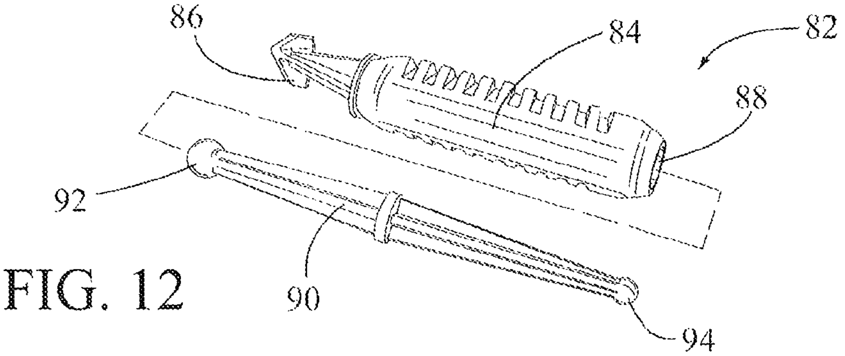
FIG. 12 is a perspective view of a caulking tool with a tool handle. The handle includes a pointed end and an open end. The open end used for receiving one end of a handle extension. Opposite ends of the handle extension include two different sizes of balls. The balls are used for smoothing a surface of a caulking bead.

In FIG. 12, a perspective view of a caulking tool, having general reference numeral 82, is shown. The caulking tool 82 includes a tool handle 84. The tool handle 84 has a pointed end 86 and an open end 88 for receiving a handle extension 90. The handle extension 90 has, at opposite ends, two different sizes of balls 92 and 94 for smoothing a surface of a caulking bead 96.

Figure 13:
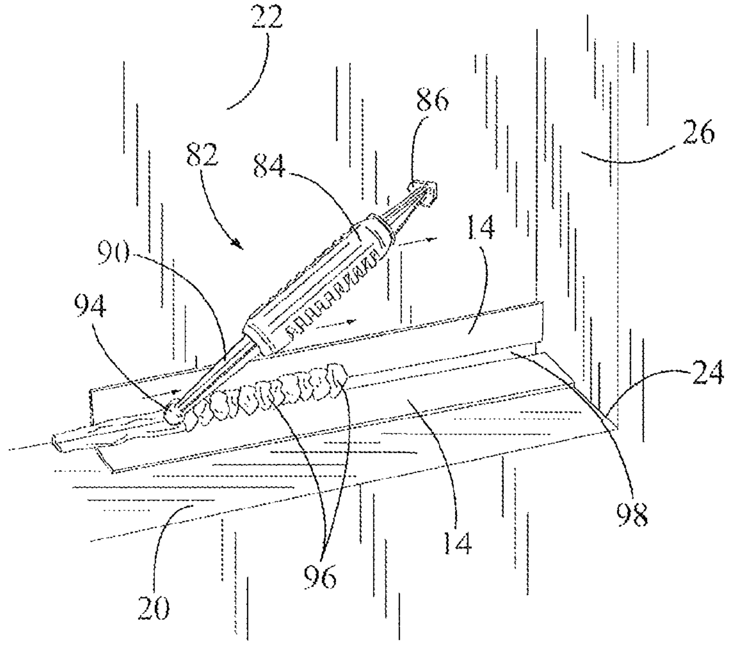
FIG. 13 illustrates the caulking tool using one of the balls on the handle extension for smoothing a caulking bead in an open space between a pair of tape strips. The tape strips disposed next to the intersection of the horizontal surface and first wall.

In FIG. 13, the caulking tool 82 is shown using one of the balls 94 on the handle extension 90 for smoothing the caulking bead 96 in an open space 98 between a pair of tape strips 14 at an intersection of the horizontal surface 20 and first wall 22.

While the invention has been particularly shown, described and illustrated in detail with reference to the preferred embodiments and modifications thereof, it should be understood by those skilled in the art that equivalent changes in form and detail may be Made therein without departing from the true spirit and scope of the invention as claimed except as precluded by the prior art.

The invention claimed is:

1. A hand-held, painting and caulking tape dispenser adapted for dispensing an adhesive tape on a tape roll, the tape having an adhesive side and a non-adhesive side, the tape dispenser is adapted for applying the tape to a horizontal surface, a vertical surface, and to a corner of an intersection of the horizontal and vertical surfaces, the tape dispenser comprising:

- a tape housing, the tape housing having a closed front portion and an open rear portion;
- a tape ring mounted inside the housing, the tape ring adapted for receiving the tape roll with the tape thereon;
- a handle formed in one end of the housing, the handle for gripping the housing and dispensing the tape in one direction therefrom;
- a semi-circular nose formed in an opposite end of the housing for receiving a portion of the tape thereon, the nose have a cutting blade opening therein, the cutting blade opening perpendicular to a length of the tape, the nose having a radius "R";
- a flat first tape engaging surface disposed along one side of the housing and between the nose and the handle, the first tape engaging surface having a first tape opening therein and adapted for receiving the tape from the tape roll;
- a flat second tape engaging surface disposed along an opposite side of the housing and between the nose and the handle, a line along a length of the first tape engaging surface and a line along a length of the second tape engaging surface forming an acute angle "Δ" from the horizontal; and
- a tape cutting blade and blade actuator mounted inside of the housing, the blade actuator extending a cutting blade outwardly from the cutting blade opening for cutting the tape across its width, a length of the tape cutting blade disposed along a center line "C-C" through a center point in the semi-circular nose, the center line "C-C" at an angle of "½Δ" from the horizontal and the acute angle "Δ" is 65.40 degrees from the horizontal.

2. The tape dispenser as described in claim 1 wherein the radius "R" is equal to a distance to the intersection of horizontal surface and the vertical surface when the semi-circular nose engages a portion of the vertical surface when applying tape to the horizontal surface.

3. The tape dispenser as described in claim 1 wherein the cutting blade actuator includes a coil spring and an actuator button, the coil spring attached on one end of the cutting blade and biasing the cutting blade against the actuator button, a tip of the cutting blade extending outwardly from the cutting blade opening when the actuator button moves the cutting blade into an extended position for cutting the tape.

4. The tape dispenser as described in claim 1 further including a second tape opening in the flat, second tape engaging surface, the second tape opening adapted for receiving tape from the tape roll when the tape housing is used for dispensing tape in an opposite direction.

5. The tape dispenser as described in claim 1 further including a tape spacer attached to tape housing, the tape spacer adapted for holding the tape housing a width "W" from a horizontal or vertical surface when dispensing the tape.

6. The tape dispenser as described in claim 1 further including a tape spacer with a wing, the tape spacer with wing attached to the tape housing, the tape spacer with wing adapted for holing the tape housing a width "W" from a horizontal or a vertical surface and guiding the housing next to an edge of the horizontal and vertical surface.

7. A hand-held, painting and caulking tape dispenser adapted for dispensing an adhesive tape on a tape roll, the tape having an adhesive side and a non-adhesive side, the tape dispenser is adapted for applying the tape to a horizontal surface, a vertical surface, and to a corner of an intersection of the horizontal and vertical surfaces, the tape dispenser comprising:

- a tape housing having a center hole therethrough, the housing having a closed front portion, an open rear portion and a center hole therethrough;
- a tape ring mounted inside the housing and disposed next to the center hole, the tape ring adapted for receiving the tape roll with the tape thereon;
- a large, semi-circular handle formed in one end of the housing for gripping the housing and dispensing the tape in one direction therefrom;
- a small, semi-circular nose formed in an opposite end of the housing for receiving a portion of the tape thereon, the nose have a cutting blade opening therein, the cutting blade opening perpendicular to a length of the tape, the nose having a radius "R", the radius "R" is equal to a distance to the intersection of horizontal surface and the vertical surface when the semi-circular nose engages a portion of the vertical surface when applying tape to the horizontal surface;
- a flat first tape engaging surface disposed along one side of the housing and between the nose and the handle, the first tape engaging surface having a first tape opening therein and adapted for receiving the tape from the tape roll;
- a flat second tape engaging surface disposed along an opposite side of the housing and between the nose and the handle, a line along a length of the first tape engaging surface and a line along a length of the second tape engaging surface forming an acute angle "Δ" from the horizontal; and
- a tape cutting blade and blade actuator mounted inside of the housing, the blade actuator extending a cutting blade outwardly from the cutting blade opening for cutting the tape across its width, a length of the tape cutting blade disposed along a center line "C-C" through a center point in the semi-circular nose, the center line "C-C" at an angle of "½Δ" from the horizontal and the acute angle "Δ" is 65.40 degrees from the horizontal.

8. The tape dispenser as described in claim 7 wherein the cutting blade actuator includes a coil spring mounted on a base inside the housing and an actuator button, the coil spring attached on one end of the cutting blade, the coil spring biasing the cutting blade against the actuator button in a retracted position, a tip of the cutting blade extending outwardly from the cutting blade opening when the actuator button moves the cutting blade into an extended position for cutting the tape.

9. The tape dispenser as described in claim 7 further including a second tape opening in the flat, second tape engaging surface, the second tape opening adapted for receiving tape from the tape roll when the tape housing is used for dispensing tape in an opposite direction.

10. The tape dispenser as described in claim 7 further including a tape spacer attached to sides of the open rear portion of the tape housing, the tape spacer adapted for holding the tape housing a width "W" from a horizontal or vertical surface when dispensing the tape.

11. The tape dispenser as described in claim 7 further including a tape spacer with a wing, the tape spacer with wing attached to sides of the open rear portion of the tape housing, the tape spacer with wing adapted for holding the tape housing a width "W" from a horizontal or a vertical surface, the wing guiding the housing next to an edge of the horizontal and vertical surface.

12. A hand-held, painting and caulking tape dispenser adapted for dispensing an adhesive tape on a tape roll, the tape having an adhesive side and a non-adhesive side, the tape dispenser is adapted for applying the tape to a horizontal surface, a vertical surface, and to a corner of an intersection of the horizontal and vertical surfaces, the tape dispenser comprising:

- a tape housing having a center hole therethrough, the housing having a closed front portion and an open rear portion;
- a tape ring mounted inside the housing and disposed next to the center hole, the tape ring adapted for receiving the tape roll with the tape thereon;
- a large, semi-circular handle formed in one end of the housing for gripping the housing and dispensing the tape in one direction therefrom;
- a small, semi-circular nose formed in an opposite end of the housing for receiving a portion of the tape thereon, the nose have a cutting blade opening therein, the cutting blade opening perpendicular to a length of the tape, the nose having a radius "R", the radius "R" is equal to a distance to the intersection of horizontal surface and the vertical surface when the semi-circular nose engages a portion of the vertical surface when applying tape to the horizontal surface;
- a flat first tape engaging surface disposed along one side of the housing and between the nose and the handle, the first tape engaging surface having a first tape opening therein and adapted for receiving the tape from the tape roll;
- a flat second tape engaging surface disposed along an opposite side of the housing and between the nose and the handle, the second tape engaging surface having a second tape opening, the second tape opening adapted for receiving tape from the tape roll when the tape housing is used for dispensing tape in an opposite direction, a line along a length of the first tape engaging surface and a line along a length of the second tape engaging surface forming an acute angle "Δ" from the horizontal; and a tape cutting blade and blade actuator mounted inside of the housing, the blade actuator extending a cutting blade outwardly from the cutting blade opening for cutting the tape across its width, a length of the tape cutting blade disposed along a center line "C-C" through a center point in the semi-circular nose, the center line "C-C" is at an angle of "½Δ" from the horizontal and the acute angle "Δ" is 65.40 degrees from the horizontal.

* * * * *